United States Patent [19]

Brandly

[11] 3,830,312
[45] Aug. 20, 1974

[54] PLOW
[76] Inventor: Ernest B. Brandly, Rt. 3 Box 90, Liberty, Ind. 46011
[22] Filed: Mar. 7, 1973
[21] Appl. No.: 338,891

[52] U.S. Cl............... 172/225, 172/282, 172/286
[51] Int. Cl...................... A01b 3/28, A01b 69/00
[58] Field of Search........... 172/212, 224, 225, 226, 172/227, 282, 285, 286

[56] References Cited
UNITED STATES PATENTS

| | | | |
|---|---|---|---|
| 3,428,136 | 2/1969 | Johannsen et al.............. | 172/225 X |
| 3,503,453 | 3/1970 | Johannsen et al.............. | 172/212 |
| 3,511,317 | 5/1970 | Richey............................ | 172/212 |
| 3,517,750 | 6/1970 | Bell.................................. | 172/226 |
| 3,604,516 | 9/1971 | Maxwell.......................... | 172/225 X |
| 3,749,178 | 7/1973 | Watts............................... | 172/212 X |
| 3,750,759 | 8/1973 | Geurts............................. | 172/285 |

FOREIGN PATENTS OR APPLICATIONS

| | | | |
|---|---|---|---|
| 1,224,076 | 9/1966 | Germany........................ | 172/285 |

*Primary Examiner*—Robert E. Pulfrey
*Assistant Examiner*—Paul T. Sewell
*Attorney, Agent, or Firm*—Biebel, French & Bugg

[57] ABSTRACT

A semi-mounted roll over plow which includes an auxiliary frame rotatably mounted on a main frame with pairs of plow bottoms mounted on opposite sides of the auxiliary frame. The auxiliary frame includes forward and rear branches extending angularly with respect to the main frame in parallel but offset relationship to each other. A ground engaging wheel is mounted at approximately the center of the plow and can be actuated to both raise and lower the main frame to provide clearance to roll the auxiliary frame about the main frame and pivoted in response to turning movement of the semi-mounting hitch to cause the wheel to pivot so that the plow tracks a tractor to which it is attached during turns.

6 Claims, 5 Drawing Figures

PATENTED AUG 20 1974　　3,830,312
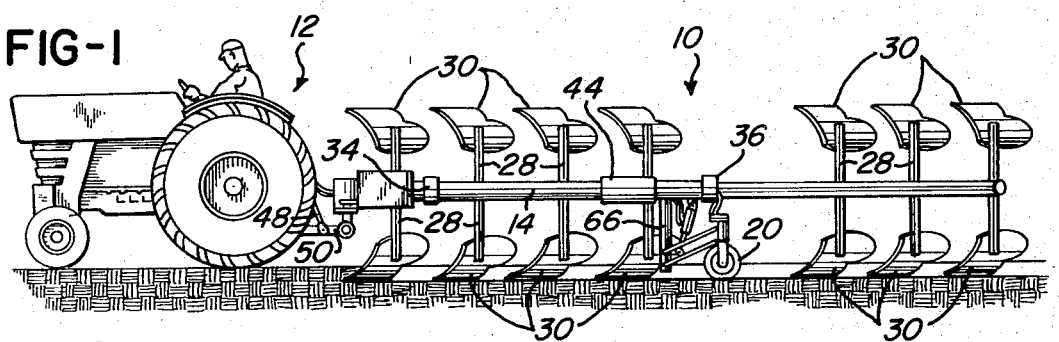
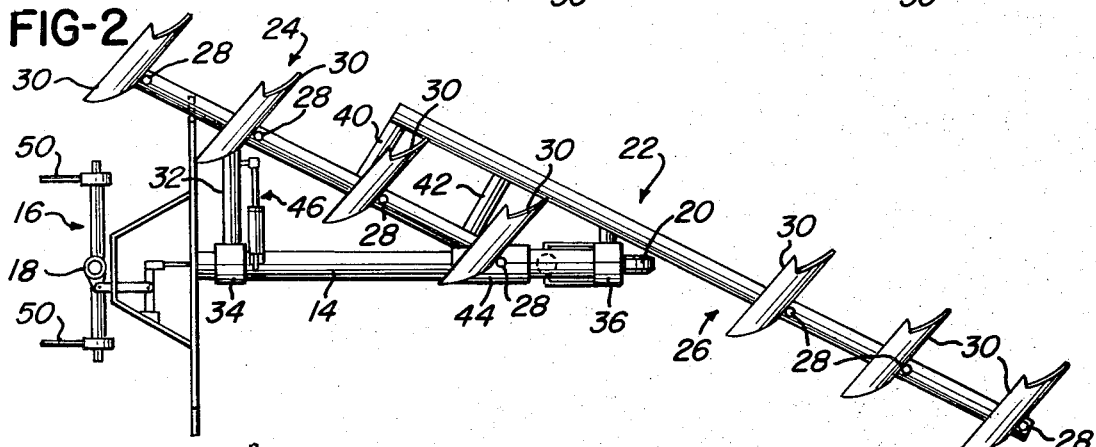
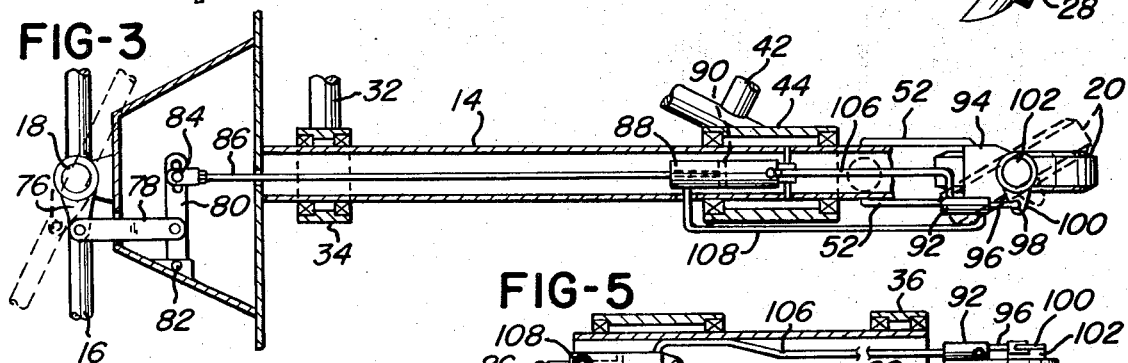
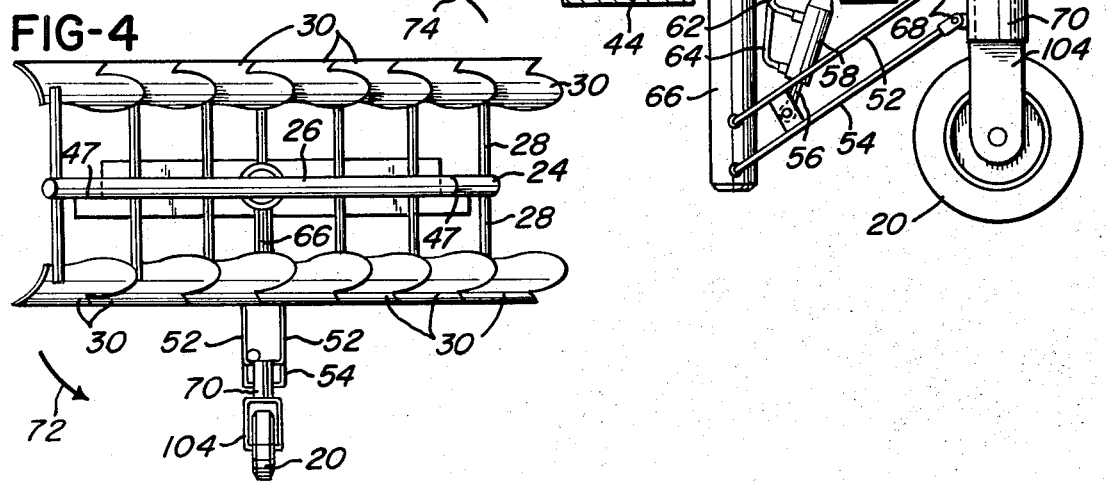

PLOW

BACKGROUND OF THE INVENTION

In plowing operations it is desirable that all furrows be turned in the same direction. Using a conventional single plow it is necessary for the plow operator to return to the beginning of the previously plowed furrow each time a row of furrows is completed in order to obtain this result.

To eliminate this additional operation while still providing uniformly turned furrows, two-way or roll over plows have been developed. For example, U.S. Pat. Nos. 2,923,362; 2,929,456; 3,174,566; Re 26,129 and 3,604,516 all disclose two-way or roll over plows.

One disadvantage associated with roll over plows is the fact that the line of draft of the plow is offset with respect to the point of pull of the tractor to which it is attached. For example, the line of draft of a plow may be found by measuring to the left of center of cut one quarter the width of cut of one bottom. To illustrate, if two 14 inch bottoms are used, the total cut will be 28 inches and of course, one half of the total cut is 14 inches. This gives the center of cut. One quarter the width of one bottom is 3½ inches. Therefore, measuring 3½ inches toward the plowed ground or in the direction of throw, will bring the center of draft 17½ inches from the furrow wall.

Obviously, where, as in the majority of roll over plows manufactured today, the plow bottoms are all disposed to one side of the point of pull of the tractor to which the plow is attached, the line of draft will be offset substantially to one side of the point of pull. Therefore, there will be a constant lateral force exerted on the tractor, which not only imposes undesirable side thrusts on the tractor bearings and other components but requires a constant counter acting steering effort by the tractor driver.

The above noted U.S. Pat. No. 3,604,516 represents somewhat of a departure from the more conventional type of two-way or roll over plow. In this particular plow, two separate sets of plow bottoms are provided with each set disposed on opposite sides of a central frame. Each of the sets is individually rotatable with respect to the central frame so that as the tractor and plow turns at the end of a furrow one set of plow bottoms is lifted upwardly from one side of the central frame over the top thereof and then downwardly to the other side.

The second set of plow bottoms can also be rotated upwardly and over the top of the central frame so that it then lies on the same side of the central frame that the first set originally occupied. Apparently to provide clearance between adjacent plow bottoms on each of the two sets as they are passed over the central frame, the sets are offset with respect to one another.

Although this construction disposes the line of draft of the plow more symmetrically than in prior art structures, it will be apparent that each of the sets of plow bottoms must be provided with separate actuating means of considerable power to raise the entire set of plow bottoms upwardly in a pivoting movement about the central frame.

Additionally, it will be noted that the plow disclosed in this patent is of the trailer type, having a set of front wheels and a rear wheel disposed at the rear of the central frame. With this type of plow a tongue is attached to the tractor and the plow pulled behind the tractor. A much more stable construction, it is believed, is obtained where the plow is semi-mounted, since there is a positive hitch between the tractor and the plow which resists sliding, side ways movement of the plow with respect to the tractor and possible tipping thereof.

Additionally, in a trailer type plow when the plow is being transported the tractor must be detached from the tongue at the forward end of the plow and attached to an extra tongue which projects from the rear of the plow.

It will further be noted that where the central ground engaging wheel, as in a trailer type plow, is positioned at the rear of the plow this wheel will run over the freshly plowed ground. This is particularly objectionable when plowing in fairly moist soil.

SUMMARY OF THE INVENTION

The present invention provides a two-way or roll over type plow in which the line of draft of the plow is substantially centrally located but which includes a single plow bottom mounting auxiliary frame rotatably mounted on a main supporting frame.

The auxiliary frame includes front and rear branches which project forwardly and rearwardly, respectively, from adjacent the rear of the main frame and are rotatable as a unit with respect thereto. Thus, not only may a single power source be utilized for rotating both branches of the auxiliary frame simultaneously, but a more balanced construction is obtained, thereby decreasing the force required to rotate the plow.

Preferably the plow is of the semi-mounted type in which a positive hitch is made between the plow and the tractor and a single pivoted ground engaging wheel is mounted on the main frame adjacent the rear portion thereof. This disposes the ground engaging wheel at approximately the center of the plow so that it will run along the bottom of a furrow rather than over freshly plowed ground.

It will also be noted that the balanced construction of the plow of the present invention is particularly advantageous during routine maintenance when the plow is unhitched from the tractor and positioned, for example, in a barn or other building. Thus, with the balanced construction the plow may actually be turned manually during repairs and other routine maintenance.

As noted above, the rear branch is offset with respect to the forward branch. This provides several advantages during operation of the plow. Thus, since the plow of the present invention utilizes an axuliary frame which rotates as a unit about the main frame, one of the plow branches must rotate downwardly beneath the main frame and thence upwardly during a roll over operation. This requires the plow to be raised above the ground to provide clearance for the branch rolling downwardly. By offsetting one branch with respect to the other gives the necessary clearance for the lifting and turning operation.

Additionally, offsetting the two branches provides an open area adjacent the rear portion of the main frame where the ground engaging wheel is mounted. This provides room for the linkage controlling the raising and lowering of the main frame with respect to the ground engaging wheel and also for the linkage to be described for pivoting the ground engaging wheel as the tractor to which the plow is attached makes a turn.

In this respect, it will be noted that the semi-mounting hitch is attached to the front end of the main frame for turning movement with respect thereto. During turning of the tractor, the semi-mounting hitch turns with the tractor and, unless some compensation is provided, the plow would not track the tractor but would instead cut across the turn.

In prior art, semi-mounted plows a mechanical linkage is sometimes provided between the tractor or the hitch and the ground engaging wheel. However, where the wheel and main supporting frame are movable vertically with respect to each other, such mechanical linkages may become unduly complicated and in fact, impractical.

To overcome this problem, the present invention incorporates a hydraulically actuated system for controlling pivoting movement of the ground engaging wheel in response to turning movement of the semi-mounting hitch. Since the hydraulic actuation system utilizes flexible hydraulic lines, relative movement between the main frame and the ground engaging wheel presents no problem.

BRIEF DESCRIPTION OF THE DRAWINGS

FIG. 1 is a side elevational view of the plow of the present invention showing it mounted on a tractor;

FIG. 2 is a plan view of the plow and a portion of the tractor hitch;

FIG. 3 is an enlarged view of a portion of the plow;

FIG. 4 is an end view of the plow in the raised position; and

FIG. 5 is a side view of a rear portion of the plow partially in cross section.

DESCRIPTION OF THE PREFERRED EMBODIMENT

As seen in FIG. 1 of the drawings, the plow 10 of the present invention is preferably of the semi-mounted type and is shown attached to a tractor 12 of any suitable design. The plow 10, as seen in FIGS. 1 and 2, includes a main supporting frame 14 having a semi-mounting hitch 16 at the front end thereof mounted for turning movement with respect thereto as indicated at 18. At its rear end the main supporting frame 14 is provided with a ground engaging wheel 20, which is both pivotally mounted and adapted to raise and lower the main frame in the manner described below.

An auxiliary frame 22 includes a front branch 24 and a rear branch 26. The front branch 24 extends forwardly from adjacent a rear portion of the main frame 14 at an acute, included angle thereto and the rear branch 26 extends rearwardly from the main frame 14 approximately parallel, but offset with respect to, the forward branch 24.

Any suitable support means, as indicated at 28, may be provided projecting from opposite sides of each of the front and rear branches of the auxiliary frame for supporting opposed pairs of plow bottoms 30. A forward strut 32 extends from the forward branch 24 to a bearing 34 encircling the main frame 14 while a second bearing 36 encircles the main frame adjacent a rear portion thereof and is attached to the rear branch 22 by means of a strut 38. The two branches 24 and 26 may be interconnected by additional struts 40 and 42 and an additional bearing 44 may be positioned intermediate the bearings 34 and 36 and attached to the auxiliary frame.

Any convenient means, such as a conventional hydraulic actuating mechanism 46, may be provided for rotating the auxiliary frame 22 on its bearings 34, 36 and 44 about the main supporting frame 14. Such actuating mechanism does not, per se, comprise the present invention and may be of any suitable design.

During turning movement of the auxiliary frame with respect to the main frame it will be seen that the plow bottoms nearest the ground on the rear branch of the auxiliary frame will rotate beneath the frame from one side thereof upwardly to the opposite side thereof, while the bottoms adjacent the ground on the forward branch will rotate from the opposite side upwardly over the main frame to the side originally occupied by the plow bottoms of the rear branch. Upon completion of each turn the front branch will rest on shoulders 47 on the main frame.

In order to permit the plow bottoms on the rear branch to clear the ground during this turning movement, means is provided for raising the main frame with respect to the ground. A conventional raising mechanism, as indicated at 48 in FIG. 1 of the drawings, may be used for raising the tractor hitch 50, thus raising the front end of the plow. However, separate means must be provided for raising the rear end of main supporting frame.

As best seen in FIG. 5 of the drawings, this includes upper and lower pairs of link members 52 and 54, to the lower pair of which is attached one end of a piston rod 56 slidably received in a cylinder 58 and attached to a piston (not shown) slidable in the cylinder 58.

Cylinder 58 is pivotally attached as at 60 to the main supporting frame 14 and hydraulic lines 62 and 64 lead to alternate sides of the cylinder 58. The forward ends of the links 52 and 54 are pivotally attached to a central post 66 while the rear ends of the links are pivotally attached, as at 68, to a collar member 70. With this construction it will be seen that pressurizing the upper side of the cylinder 58 will cause the piston rod 56 to slide downwardly, pivoting the two link members and causing the main frame 14 to raise with respect to the ground to the position shown in FIG. 4 of the drawings.

In this position the lower plow bottoms 30 on the rear branch 26 have sufficient clearance to roll beneath the main frame, as indicated by the arrow 72 in FIG. 4 of the drawings. At the same time, of course, the bottoms 30 on the forward branch 24 can roll upwardly over the main frame in the direction indicated by the arrow 74.

As noted above, it is desirable that the plow track the tractor to which it is attached during a turn rather than cutting across the turn. To accomplish this, mechanism is provided as described below with reference to FIGS. 3 and 5 of the drawings.

A short crank arm 76 is attached to and movable with the semi-mounting hitch 16. A link 78 is pivotally attached at one of its ends to the crank arm and at its opposite end to a link 80 intermediate the ends thereof. Link 80 is pivotally attached at 82 to a portion of the main frame and is pivotally attached by means of a slotted connection 84 to one end of a connecting rod 86.

Connecting rod 86 extends rearwardly through the interior of the hollow tubular portion of the main frame 14 and extends into a first cylinder 88 through suitable seals at the forward end thereof. A piston 90 is attached to the rod 86 and slidable within the cylinder 88. A second piston 92 is pivotally mounted on a bracket 94 fixed to the collar 70 and has a piston (not shown) slidably received therein and connected to a piston rod 96.

Piston rod 96 is pivotally attached at 98 to a short crank arm 100 fixed to and rotatable with a center post 102 which rotatably mounts the wheel 20 within its bifurcated lower end 104. A pair of pressurized fluid lines 106 and 108 interconnect corresponding ends of the cylinder 88 and 92.

With this construction, it will be apparent that turning movement of the tractor will cause the semi-mounting hitch 16 to turn as indicated by broken lines in FIG. 3 of the drawings. This turning movement will be transmitted through the linkage described above to the rod 86, which will cause sliding movement of the piston 90 within the cylinder 92.

This in turn will cause pressurized fluid to be transmitted from the piston 88 through one of the lines 106 or 108 to a corresponding end of the cylinder 92, while fluid from the opposite end of the cylinder 92 will be directed to the corresponding end of the cylinder 88. The overall effect will be to cause pivoting movement of wheel 90 with respect to the main frame 14 as indicated by the broken lines in FIG. 3 of the drawings, allowing the plow to track the tractor during a turn.

From the above it will be seen that the present invention provides a two-way or roll over plow in which the line of draft of the plow is substantially centrally located with respect to the line of pull to the tractor. This construction also provides a balanced assembly, facilitating rolling and reducing the power necessary for the rolling operation of the plow.

Additionally, the present invention provides a steerable rear wheel which causes the plow to track the tractor to which it is attached during a turn and in this regard the offset construction of the two branches of the auxiliary frame provide clearance for not only the turning mechanism, but also for mechanism for raising and lowering the main frame for rolling of the plow bottoms and transit operations.

It will be further noted that with the steerable rear wheel located at approximately the center of the plow the wheel will engage the ground adjacent the bottom of the furrow rather than moving over freshly plowed ground.

While the form of apparatus herein described constitutes a preferred embodiment of the invention, it is to be understood that the invention is not limited to this precise form of apparatus, and that changes may be made therein without departing from the scope of the invention.

What is claimed is:
1. A roll over plow comprising:
a. an elongated, main supporting frame,
b. a semi-mounting hitch mounted on a forward end of said frame,
c. an auxiliary frame,
d. said auxiliary frame including a forward branch and a rear branch fixed with respect to each other,
e. said forward branch projecting forwardly and outwardly from adjacent a rear portion of said main frame at an acute included angle thereto,
f. said rear branch projecting rearwardly from adjacent said rear portion of said main frame substantially parallel to said forward branch but offset outwardly thereof in nonaligned relationship thereto,
g. a plurality of pairs of plow bottoms mounted on each of said branches with said bottoms disposed with respect to each other such that the line of draft of said plow is located substantially centrally thereof, and
h. means rotatably mounting said auxiliary frame on said main frame and permitting said rear branch and plow bottoms mounted on one side thereof to roll downwardly from one side of said main frame and thence upwardly to the opposite side thereof while said front branch simultaneously rolls from said opposite side of said main frame upwardly and thence downwardly to said one side thereof.

2. The plow of claim 1 further comprising:
a. a ground engaging wheel mounted on said main frame adjacent said rear portion thereof.

3. The plow of claim 2 wherein:
a. said ground engaging wheel is mounted on said main frame behind the rearmost plow bottom on said forward branch whereby said wheel engages the bottom of a furrow during plowing operations.

4. The plow of claim 2 further comprising:
a. means for varying the spacing between said main frame and said ground engaging wheel to effect raising and lowering of said main frame.

5. The plow of claim 2 further comprising:
a. means for transmitting turning movement of said semi-mounting hitch to said ground engaging wheel to cause said wheel to pivot about a substantially vertical axis and track a tractor on which said plow is semi-mounted.

6. The plow of claim 5 wherein said transmitting means comprises:
a. a first piston and cylinder mounted on said frame,
b. linkage means interconnecting said semi-mounting hitch and said first piston to cause movement thereof in said first cylinder in response to said turning movement of said hitch,
c. a second piston and cylinder mounted adjacent said ground engaging wheel,
d. linkage means interconnecting said ground engaging wheel and said second piston to cause pivoting of said ground engaging wheel in response to sliding movement of said second piston in said second cylinder, and
e. pressurized fluid lines interconnecting corresponding sides of said first and second cylinders, whereby movement of said first piston in said first cylinder results in corresponding movement of said second piston in said second cylinder.

* * * * *